(12) United States Patent
Sachtleben

(10) Patent No.: US 6,779,437 B2
(45) Date of Patent: Aug. 24, 2004

(54) ARRANGEMENT FOR PRODUCING A BREWED BEVERAGE, IN PARTICULAR COFFEE

(75) Inventor: Andreas Sachtleben, Minden (DE)

(73) Assignee: Melitta Haushaltsprodukte GmbH & Co., KG., Minden (DE)

(*) Notice: Subject to any disclaimer, the term of this patent is extended or adjusted under 35 U.S.C. 154(b) by 28 days.

(21) Appl. No.: 10/229,046

(22) Filed: Aug. 28, 2002

(65) Prior Publication Data

US 2003/0041738 A1 Mar. 6, 2003

(30) Foreign Application Priority Data

Aug. 30, 2001 (DE) .................................. 201 14 328 U

(51) Int. Cl.[7] .............................................. A47J 31/06
(52) U.S. Cl. ............................................ 99/305; 99/315
(58) Field of Search ..................... 99/305, 315, 299, 99/312, 279, 306, 304, 307

(56) References Cited

U.S. PATENT DOCUMENTS 2,948,618 A * 8/1960 Saint .......................... 426/433
3,333,964 A * 8/1967 Bender ....................... 426/433
4,070,956 A * 1/1978 Brown ........................ 99/304
4,920,869 A * 5/1990 Landais ...................... 99/283
6,513,419 B2 * 2/2003 Huber et al. ................. 99/315

* cited by examiner

Primary Examiner—Reginald L. Alexander
(74) Attorney, Agent, or Firm—Venable LLP; Robert Kinberg; Catherine M. Voorhees

(57) ABSTRACT

An arrangement for producing a brewed beverage, in particular coffee, with the arrangement comprising an approximately truncated-cone shaped filter receptacle for holding a cone-shaped filter insert and a water intake device that is arranged above the filter receptacle and is provided with a water distributor having a plurality of flow-through openings on a side facing the filter receptacle with one flow-through opening be located in the center of the projection surface for the water distributor and the filter receptacle. Additional flow-through openings are arranged along a peripheral line, for which the course approximately corresponds to the peripheral outline of a projection surface for the filter receptacle inside space in the lower to mid-level region of the filter receptacle.

5 Claims, 3 Drawing Sheets ns, wherein one flow-through opening is located in the center of the projection surface for the water distributor and the filter receptacle. Arrangements of this type primarily are components of so-called coffee machines and, as such, are used in nearly all households these days.

ARRANGEMENT FOR PRODUCING A BREWED BEVERAGE, IN PARTICULAR COFFEE

CROSS-REFERENCE TO RELATED APPLICATION

This application is based on and claims the priority date of German Application No. 201 14 328.3, filed on Aug. 30, 2001, which is incorporated herein by reference.

BACKGROUND OF THE INVENTION

The present invention relates to an arrangement for producing a brewed beverage, in particular coffee, comprising a filter receptacle with an approximately truncated cone shape for holding a cone-shaped filter paper of mesh insert, as well as a water intake device arranged above the filter receptacle. The water intake device is provided on the side opposite the filter receptacle with a water distributor having a plurality of flow-through openings, wherein one flow-through opening is located in the center of the projection surface for the water distributor and the filter receptacle. Arrangements of this type primarily are components of so-called coffee machines and, as such, are used in nearly all households these days.

Of course, coffee machines also comprise other components and functional units, for example, a fresh-water container, a flow-through heater, a holding container for the finished filtered product and a heating plate onto which the latter holding container is placed, Once a coffee machine is turned on, the water inside the fresh water container is heated with the flow-through heater and moves through a rising tube to the top and into an arrangement of the above-mentioned type. That is, the heated brewing water flows from the rising pipe into the water intake device. From there, the brewing water flows through the flow-through openings of the water distributor into the filter receptacle underneath that was provided earlier with a cone-shaped filter insert, and filled with a predetermined amount of ground coffee.

The heated brewing water flows through the coffee grounds, leaching them out in the process. The resulting filtered product then flows into the holding container provided underneath the filter receptacle.

In most cases, an arrangement of the type initially described is a component of a coffee machine, the operation of which was described in principle above. However, it can also be used separately and brewing water can be poured in manually, meaning it does not have to be used in connection with a known coffee machine.

The purpose of an arrangement as initially defined above is to influence the drinking strength of the generated brewed beverage through the arrangement of the flow-through openings inside the water distributor If the brewing water flows exclusively through the centrally arranged flow-through opening of the water distributor, the coffee grounds in the filter receptacle are swirled up strongly and result in the brewing of a relatively strong coffee.

On the other hand, if the water flows through the remaining flow-through openings located outside of the center, a milder coffee is brewed.

With known arrangements of the initially described type, the flow-through openings outside of the central opening are arranged in concentric circles around the centrally located flow-through opening.

However, since the projection surface of a filter receptacle is no longer circular in the region of the coffee grounds, meaning in the lower to mid-level region, the above-described arrangement of the additional flow-through openings can no longer be viewed as an optimum arrangement. The danger exists that a portion of the brewing water flowing out through these openings does not directly flow onto the coffee grounds, but onto the side-wall region of the filter receptacle. An optimum use of the coffee grounds is therefore not possible.

SUMMARY OF THE INVENTION

It is the object of the present invention to provide an arrangement of the type initially described above which always results in an optimum use of the aroma carrier, regardless of which flow-through opening is used for producing a brewed beverage.

The above object generally is achieved according to the invention by arranging additional flow-through openings along a peripheral line. The course of this line corresponds approximately to the peripheral outline of a projection surface inside space of the filter receptacle in the lower to mid-level region of the filter receptacle.

With an arrangement according to the invention the water flow-through openings arranged outside of the center are thus configured to correspond mostly to the peripheral outline of a projection surface inside space of the filter receptacle in the lower to mid-level region of this filter receptacle. Thus, if these additional flow-through openings are used, the brewing water in the edge regions always flows directly onto the coffee grounds inside the filter receptacle or another aroma carrier. Thus, an optimum use of the aroma carrier is ensured, even if the outer flow-through openings are used. Additional features of the invention likewise are disclosed.

Exemplary embodiments of the invention are represented in the attached drawings and are described in further detail below.

DESCRIPTION OF THE PREFERRED EMBODIMENTS

Figure 1:
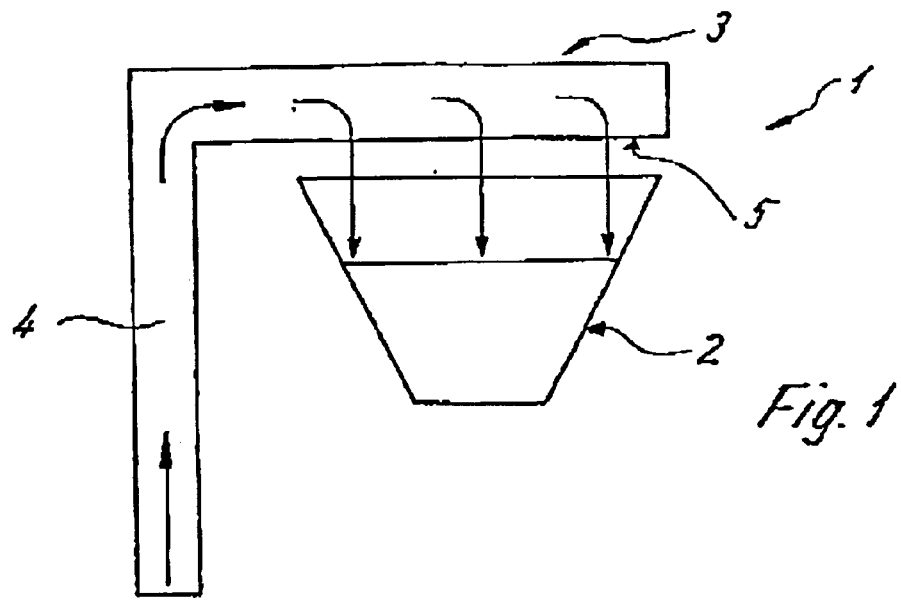
FIG. 1 is highly schematic view from the side of an arrangement according to the invention for producing a brewed beverage.

The reference number 1 in FIG. 1 relates to the arrangement for producing a brewed beverage, in particular coffee, which comprises a filter receptacle 2 with approximately truncated cone shape as well as a water intake device 3. The water intake device 3 is located during the operation above the filter receptacle 2 and is supplied with brewing water that moves, for example, through a rising tube 4.

On the side facing the filter receptacle 2, or on its opposing side, the water intake device 3 is provided with a water distributor 5 having a plurality of flow-through openings 6, 7. The flow-through opening with reference number 6 is located in the center of the projection surface for the water distributor 5 and the filter receptacle 2. The flow-through openings with reference number 7 on the other hand are located along a peripheral line that corresponds approximately to the peripheral outline of a projection surface for the filter receptacle inside space 2a in the lower to mid-level region of the filter receptacle 2. This peripheral outline can be called approximately elliptical as can be seen clearly in the representation shown in FIG. 2.

Figure 2:
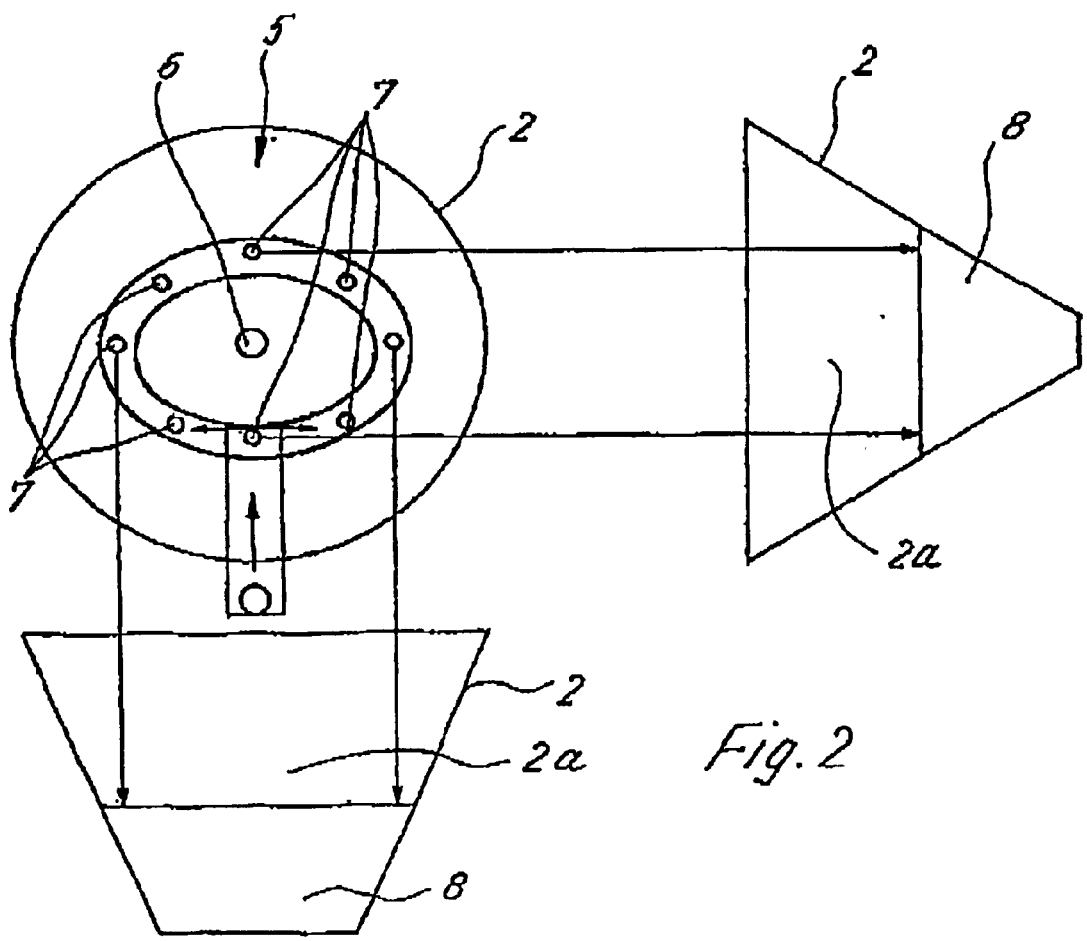
FIG. 2 is a highly schematic view from the top of an arrangement according to FIG. 1 showing side views, arranged at a right angle to each other, of a filter receptacle for the arrangement.

The two side views of the filter receptacle 2 in FIG. 2 clearly show that with the above-described arrangement of the outer flow-through openings 7, brewing water can always flow directly onto the coffee grounds 8 inside the filter receptacle. The two side views of the filter receptacle 2 also clearly show that the clear width of the filter receptacle can differ—in viewing directions offset by 90° relative to each other—thus resulting on the whole in an elliptical peripheral outline.

The closing means and/or special guide systems that ensure that either the central flow-through opening 6 and/or the outer flow-through openings 7 are supplied with brewing water are conventional and are omitted herein for clarity. However, it is clear that these options can be provided for producing brewed beverages of different strengths.

The exemplary embodiment according to the invention, shown in FIG. 2, provides only for a single ring of outer flow-through openings 7.

Figure 3:
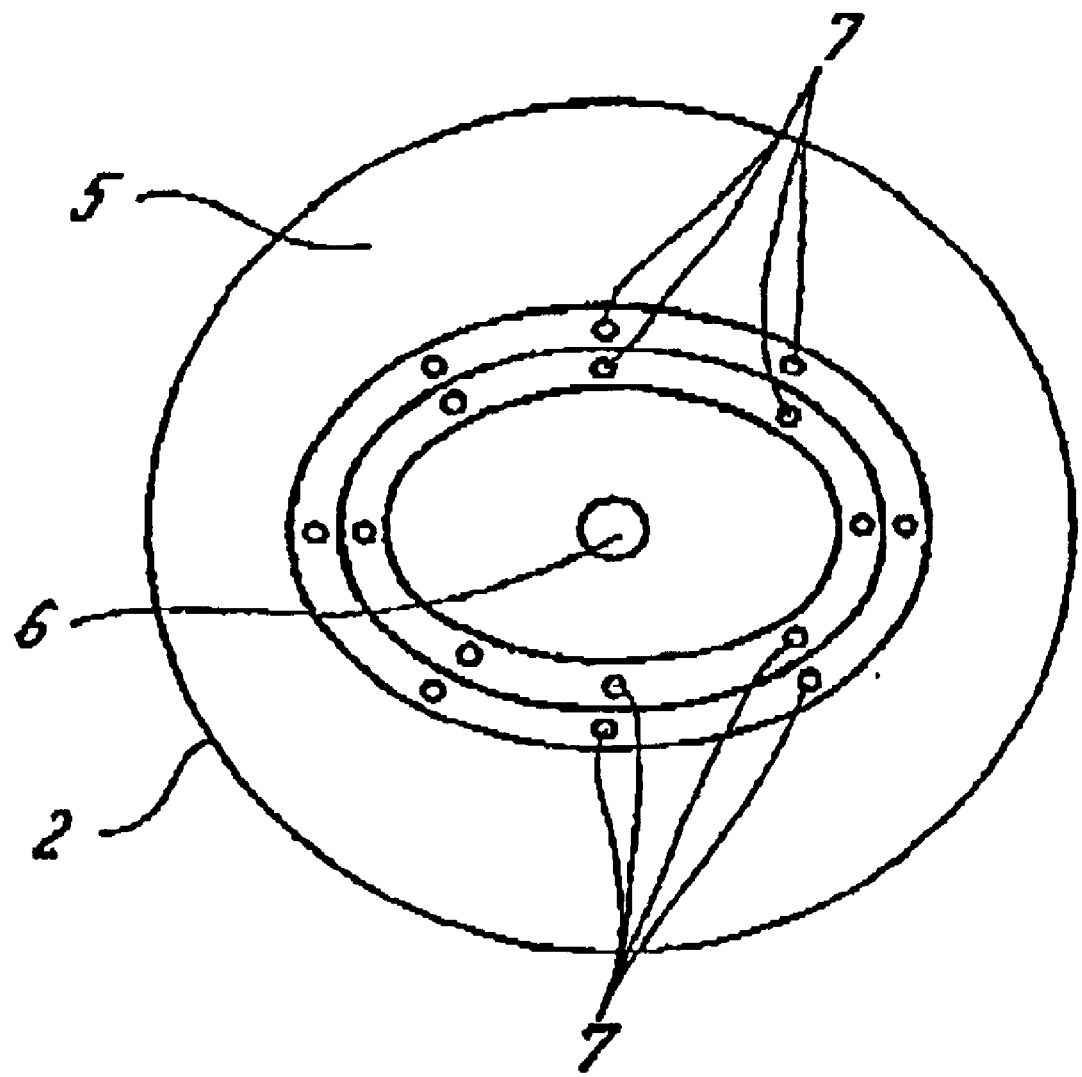
FIG. 3 is a view from above that corresponds to FIG. 2 of an arrangement according to the invention, based on a different exemplary embodiment of the invention.
Figure 4:
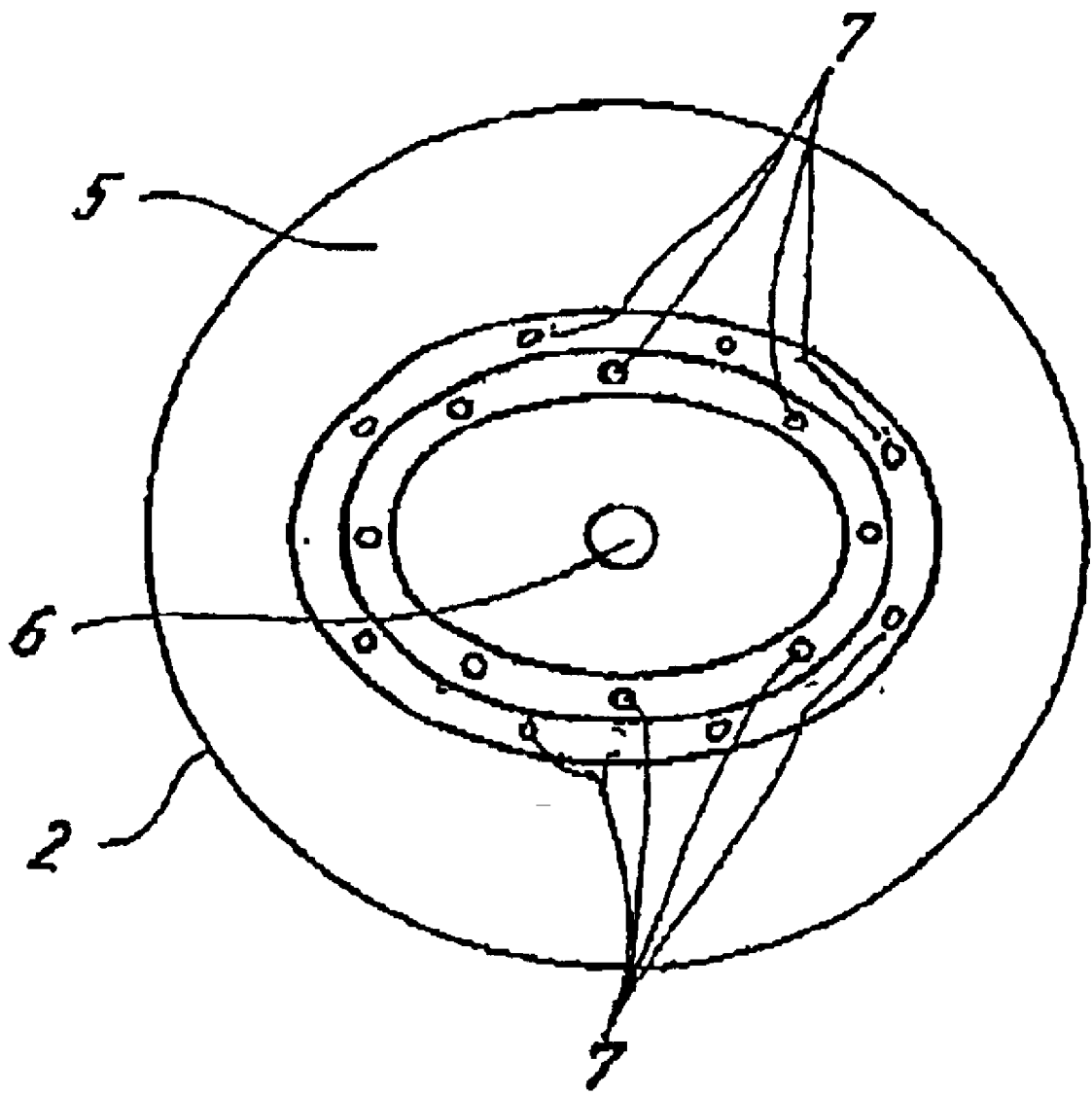
FIG. 4 is a view similar to FIG. 3 of a modification of the arrangement of FIG. 3.

FIG. 3, on the other hand, shows that two parallel extending rows of outer flow-through openings 7 can also be provided. With the embodiment according to FIG. 3, the outer flow-through openings 7 that are arranged along different lines are respectively arranged opposite each other or aligned in the radial direction. A variation is conceivable in this connection, with the outer flow-through openings 7 arranged on different lines being relatively offset to the side relative to each other, i.e., not aligned in the radial direction. For example as shown in FIG. 4.

Of course, it is also conceivable to provide additional rows of outer flow-through openings 7 by more than two rows.

The invention now being fully described, it will be apparent to one of ordinary skill in the art that many changes and modifications can be made thereto without departing from the spirit or scope of the invention as set forth herein.

What is claimed is:

1. An arrangement for producing a brewed beverage comprising an approximately truncated-cone shaped filter receptacle for holding a cone-shaped filter insert; and, a water intake device that is arranged above the filter receptacle and is provided with a water distributor having a plurality of flow-through openings on a side facing the filter receptacle, wherein a projection surface of the filter receptacle inside space is approximately elliptical in a lower to mid-level region, and wherein one flow-through opening is located in a center of a projection surface for the water distributor and the filter receptacle, and additional flow-through openings are arranged along a peripheral line that approximately corresponds to a peripheral outline of the a projection surface of the filter receptacle inside space in the lower to mid-level region of the filter receptacle.

2. A device according to claim 1, wherein two or more peripheral lines of said flow-through openings are arranged adjacent to each other outside of and around the central flow-through opening.

3. A device according to claim 2, wherein the flow-through openings provided outside of the central flow-through opening are arranged in respective peripheral lines and radially offset with respect to each other.

4. A device according to claim 2, wherein the flow-through openings provided outside of the central flow-through opening are arranged in respective peripheral lines and radially aligned with respect to each other.

5. A device according to claim 1, wherein the additional flow-through openings are arranged along a peripheral line that is approximately elliptical.

* * * * *